Since $\Sigma$ and $K^*$ vary in accordance with different operation modes, they must be obtained for each operation mode.

In the I-P mode, since $F_1^* = F_2^* = 0$ is established, the following simultaneous equations are given:

$$\begin{cases} K^*(\Gamma_2\Sigma^2 + T\Sigma/2) = (H_1 + H_0T/2) & (84) \\ K^*(\Gamma_3\Sigma^3 + \Gamma_2T\Sigma^2 + T^2\Sigma/3) = (H_2 + H_1T + H_0T^2/3) & (85) \end{cases}$$

When $K^*$ is eliminated from equations (84) and (85), the equation about $\Sigma$ is obtained as follows:

$$(H_1+H_0T/2)\Gamma_3\Sigma^2-(H_2-H_0T^2/6)\Gamma_2\Sigma-(H_2/2+H_1T/6)T=0 \quad (86)$$

Equation (86) is rewritten as follows:

$$\Gamma_3\Sigma^2 - (\tilde{H}_1 - T/3)\Gamma_2\Sigma - \tilde{H}_1 T/2 = 0 \quad (87)$$

where $$\tilde{H}_1 = [(H_1 + H_0T/2)^{-1}(H_2 + H_1T/3)]\text{diag} \quad (88)$$

The unknown matrix $\Sigma$ is given by a smallest positive root of equation (87).

The control parameter matrices $K^*$ and $F_0^*$ in the I-P mode can be obtained as follows:

$$K^* = (H_1+H_0T/2)(\Gamma_2\Sigma^2+T\Sigma/2)^{-1} \quad (89)$$

$$F_0^* = K^*\Sigma - H_0 \quad (90)$$

In the I-PD mode, $F_2^* = F_3^* = 0$ is given, so that the following simultaneous equations are obtained:

$$\begin{cases} K^*(\Gamma_3\Sigma^3 + \Gamma_2T\Sigma^2 + T^2\Sigma/3) = & (91) \\ \quad (H_2 + H_1T + H_0T^2/3) \\ K^*(\Gamma_4\Sigma^4 + 3\Gamma_3T\Sigma^3/2 + 11\Gamma_2T^2\Sigma^2/12 + T^3\Sigma/4) = & (92) \\ \quad (H_3 + 3H_2T/2 + 11H_1T^2/12 + H_0T^3/4) \end{cases}$$

When the parameter $K^*$ is eliminated from equations (91) and (92), the following equation about $\Sigma$ is obtained:

$$(H_2 + H_1T + H_0T^2/3)\Gamma_4\Sigma^3 + (-H_3 + 7H_1T^2/12 + H_0T^3/4)\Gamma_3\Sigma^2 + (-H_3 - 7H_2T/12 + H_0T^3/18)\Gamma_2T\Sigma + (-H_3/3 - H_2T/4 - H_1T^2/18)T^2 = 0 \quad (93)$$

Equation (93) is written in the following manner:

$$\Gamma_4\Sigma^3 - (\tilde{H}_2 - 3T/4)\Gamma_3\Sigma^2 - (\tilde{H}_2 - T/6)T\Gamma_2\Sigma - \tilde{H}_2 T^2/3) = 0 \quad (94)$$

for $$\tilde{H}_2 = [(H_2 + H_1T + H_0T^2/3)^{-1} \times (H_3 + 3H_2T/4 + H_1T^2/6)]\text{diag} \quad (95)$$

The unknown matrix $\Sigma$ is the smallest positive root of equation (94). In the I-PD mode, the control parameter matrices $K^*$, $F_0^*$ and $F_1^*$ are obtained as follows:

$$K^*=(H_2+H_1T+H_0T^2/3)\times(\Gamma_3\Sigma^3+T\Gamma_2\Sigma^2+T^2\Sigma/3)^{-1} \quad (96)$$

$$F_0^* = K^*\Sigma - H_0 \quad (97)$$

$$F_1^* = K^*\Gamma_2\Sigma^2 + K^*T\Sigma/2 - H_1 - H_0T/2 \quad (98)$$

The parameter tuning circuit 36 produces optimal values of the control parameters $K^*$, $F_0^*$ and $F_1^*$ for the sampled-data I-PD controller 16 in accordance with the identified process dynamic characteristic. In other words, the parameter tuning circuit 36 tunes the parameters.

The data $g_{ij}(z_i^{-1})$ and $\lambda_{ij}(z_i^{-1})$ of the controllers in FIG. 2 satisfies the following relations when the ij components of the $K^*$, $F_0^*$ and $F_1^*$ are given as $k_{ij}^*$, $f_{0ij}^*$ and $f_{1ij}^*$:

$$g_{ij}(z_j^{-1}) = g_{0ij}(1-z_j^{-1})^{-1} \quad (99)$$

for $$g_{0ij} = k_{ij}^* \cdot \tau_j \quad (100)$$

$$\lambda_{ij}(z_j^{-1}) = (\lambda_{0ij} - \|_{1ij}z_j^{-1} + \lambda_{2ij}z_j^{-2}) \times (1-z_j^{-1})^{-1} \quad (101)$$

for $$\lambda_{0ij} = f_{0ij}^* + f_{1ij}^* \cdot \tau_j^{-1} \quad (102)$$

$$\lambda_{1ij} = f_{0ij}^* + 2f_{1ij}^* \cdot \tau_j^{-1} \quad (103)$$

$$\lambda_{2ij} = f_{1ij} \quad (104)$$

The control variable $u^*$ can be calculated by $e^*$ and $y^*$ in accordance with the velocity type control algorithm given by the following equations:

$$u_{ij}^*(k\tau_j) = u_{ij}^*(\overline{k-1}\tau_j) + \delta u_{ij}^*(k\tau_j) \quad (105)$$

for $$\delta u_{ij}^*(k\tau_j) = g_{0ij}e_j^*(k\tau_j) - \lambda_{0ij}y_j^*(k\tau_j) + \lambda_{1ij}y_j^*(\overline{k-1}\tau_j) - \lambda_{2ij}y_j^*(\overline{k-2}\tau_j) \quad (106)$$

The sampled-data I-PD control can be performed for the multi-input/multi-output process 10 in accordance with its dynamic characteristic.

According to the present invention as described above, in order to satisfy the identifiability condition, the identification signal of several percentages of the control variable are applied to the output terminal of the controller (i.e., input terminal of the process), so that the process dynamic characteristic (pulse transfer function) can be identified. The S-transfer function is obtained from the identified pulse transfer function and is matched with the noninterference multi-input/multi-output reference model whose overshoot can be arbitrarily determined for every loop, thereby obtaining the sampled-data I-PD control parameters. Therefore, these control parameters can be auto-tuned in accordance with the process dynamic characteristic. For this reason, even if the process to be controlled tends to be interfered with, or has different set-point values of the respective loops, each loop can be optimally controlled. In addition, since I-PD control instead of PID control is performed, the cancellation of pole-zero does not occur. Therefore, according to the invention the controlled variable can be always optimally controlled to be equal to the set-point value and will not be influenced by disturbance. Furthermore, since a small amplitude identification signal is used, the process will not be

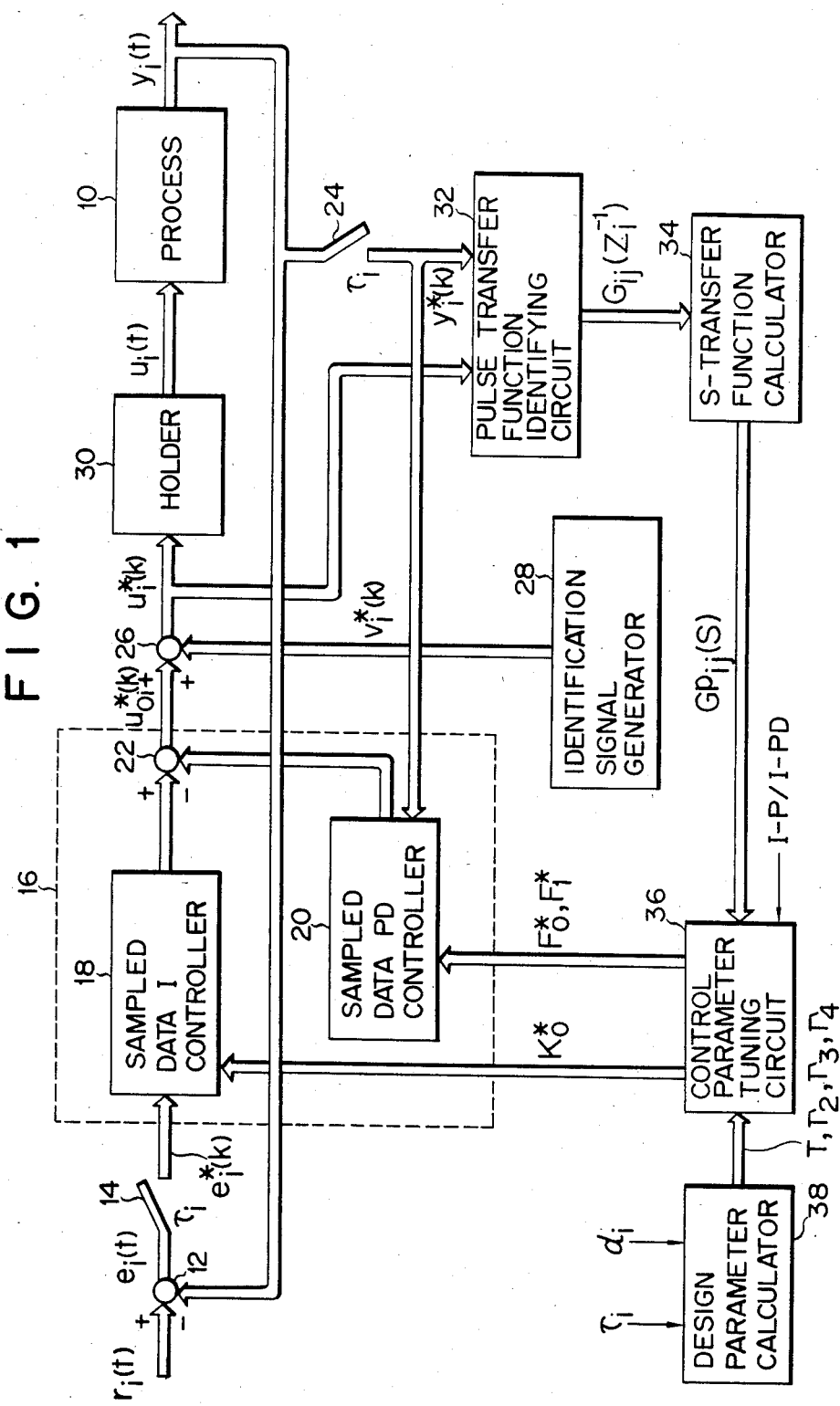
F I G. 1

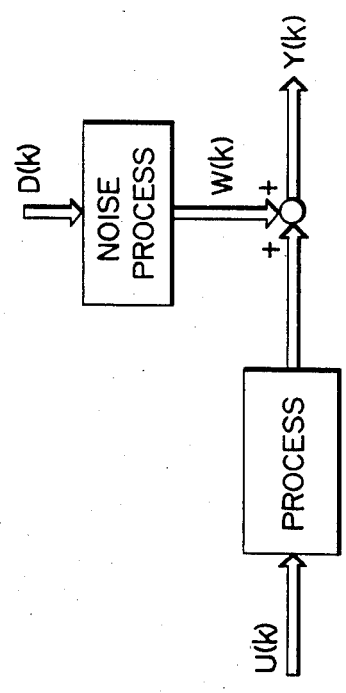
F I G. 3
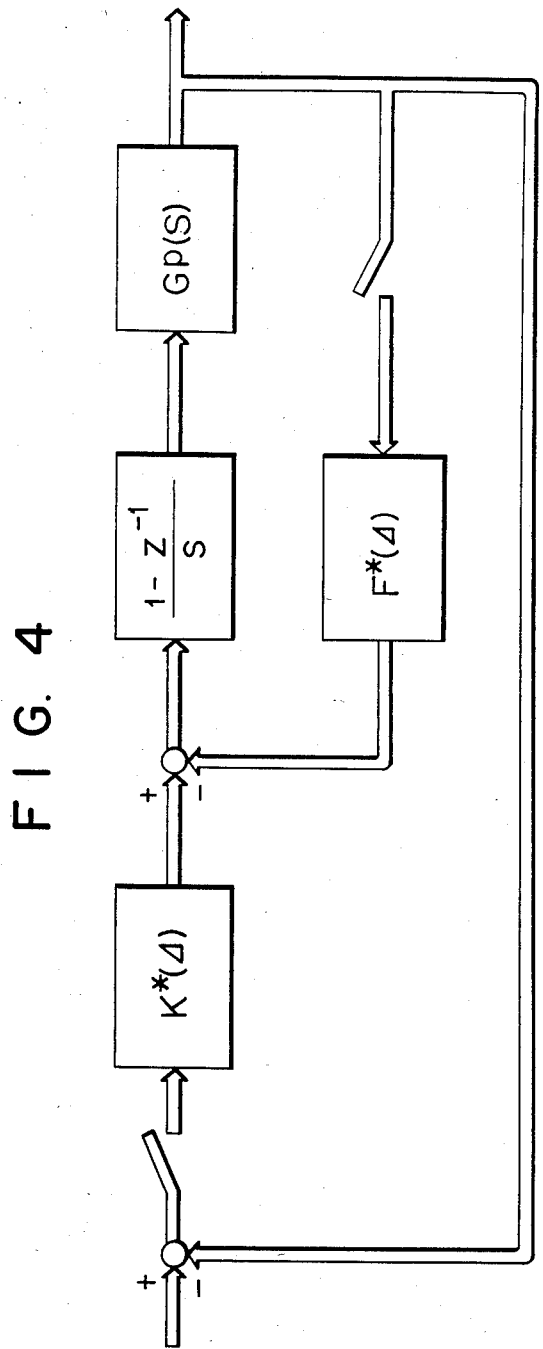
F I G. 4

SAMPLED-DATA I-PD CONTROL APPARATUS

BACKGROUND OF THE INVENTION

The present invention relates to a sampled-data I-PD control apparatus.

An example of a sampled-value control system for controlling a multi-input/multi-output process is proposed by the present inventors as per "Design of Sampled-Data Noninterference I-PD Control System having Different Sampling Periods" (the 25th Automatic Control Association Meeting, Nov. 18 to 20, 1982). According to this system, an optimal sampling period is preset for every control loop in accordance with the characteristics and specifications of input/output loops of a process to be controlled. Therefore, unlike conventional control systems wherein the shortest sampling periods must be preset for all control loops, the calculation time for sampled-data control can be shortened. However, the design described above is based upon an assumption that the dynamic characteristic of the process is known. An auto-tuning function is not included in the above-mentioned design. In auto tuning, the process dynamic characteristic is identified during the closed loop control of the process and the sampled-data I-PD control parameters are tuned in accordance with the identification result. For this reason, when the dynamic characteristic of the process changes, the control apparatus cannot continue to control the process properly. In addition to this disadvantage, the above-mentioned design is made only to satisfy a predetermined design specification, and fails to provide flexibility in the control system. For example, in the control system, noninterfered control loops have zero steady-state errors and an overshoot of the step response by 10%. For this reason, the design specification for providing a control system which is free from overshoot cannot be obtained.

SUMMARY OF THE INVENTION

It is an object of the present invention to provide a sampled-data I-PD control apparatus for identifying dynamic characteristic of an interference multi-input/-multi-output process and for auto-tuning sampled-data I-PD control parameters in accordance with the identified dynamic characteristic.

The above object can be accomplished by a sampled-data I-PD control apparatus for an N- (any natural number) input/N-output process, which comprises, a control error calculator for calculating differences between N-outputs of the process and corresponding N set-point values to generate N control errors, a sampled-data I-PD controller for calculating the N outputs of the process and the N control errors in accordance with sampled-data I-PD control parameters to obtain N control variables, and for supplying the N control variables to N inputs of the process, an identification signal generator for respectively supplying N persistently exciting identification signals to the N inputs of the process, an identification circuit for identifying a pulse transfer function of the process in accordance with the N inputs and N outputs of the process while the N persistently exciting identification signals are supplied to the N inputs, an S-transfer function calculator for transforming an identified pulse transfer function to an S-transfer function, and a tuning circuit for calculating an S-transfer function from the set-point value to the process output in accordance with a transformed S-transfer function, matching the calculated S-transfer function with an S-transfer function from the set-point value to the process output of a noninterference N-input/N-output process model, and tuning the sampled-data I-PD control parameters in accordance with a matching result.

BRIEF DESCRIPTION OF THE DRAWINGS

FIG. 1 is a block diagram of a sampled-data I-PD control apparatus according to an embodiment of the present invention;

FIG. 3 is a block diagram showing a discrete time model of a process;

FIG. 4 is a block diagram of a sampled-data I-PD control system model; and

DETAILED DESCRIPTION OF THE PREFERRED EMBODIMENT

Figure 2:
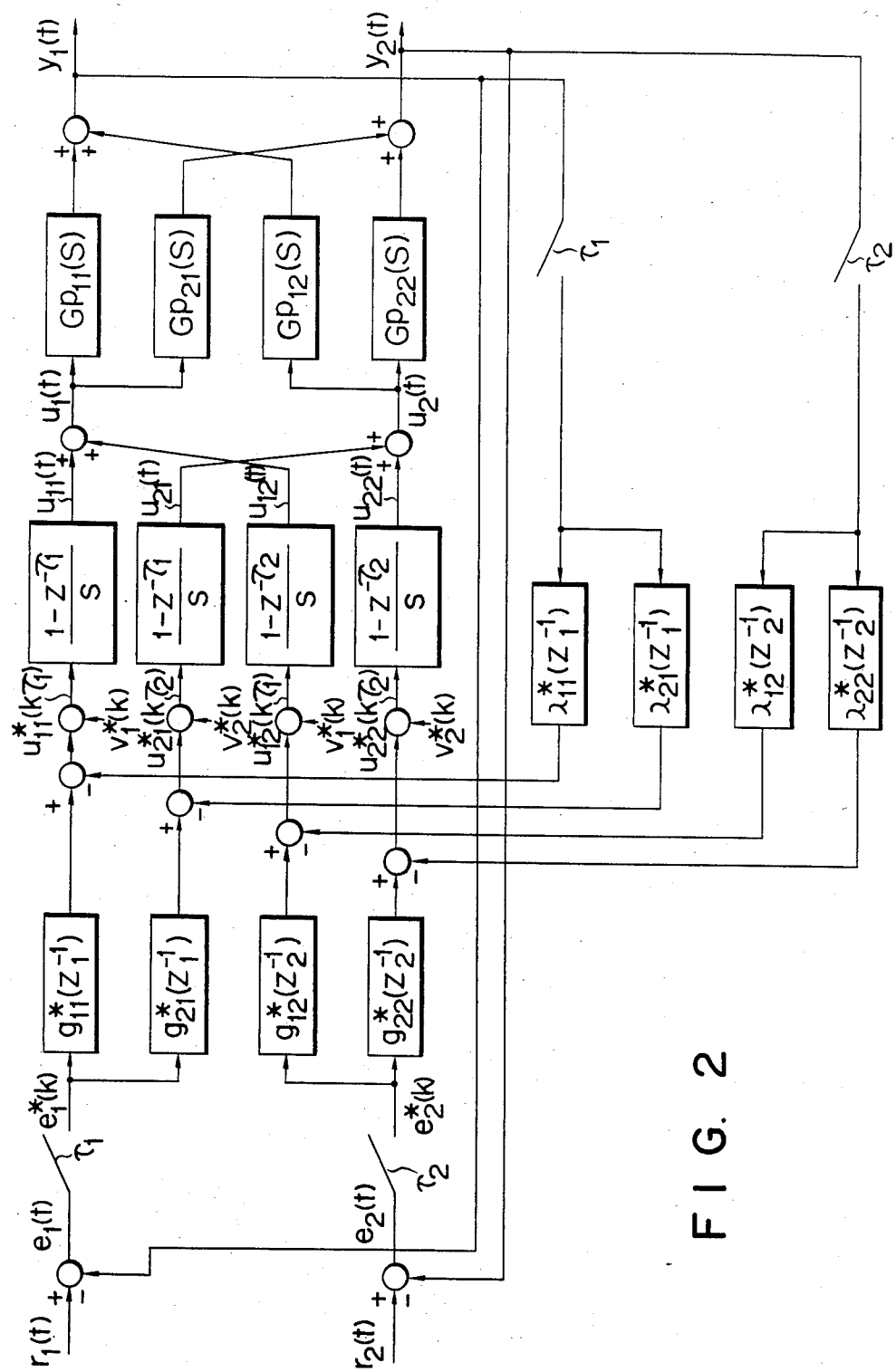
FIG. 2 is a block diagram showing the detailed configuration of a control system for a 2-input/2-output process.

A sampled-data I-PD control apparatus according to an embodiment of the present invention will be described with reference to the accompanying drawings. FIG. 1 is a block diagram of a sampled-data I-PD control apparatus for controlling an interference multi-input/multi-output process 10 in a closed loop. The multi-input/multi-output process 10 has a plurality of controlled variables such as a temperature, a humidity, a pressure, or a water level, and a plurality of control variables for respectively controlling the controlled variables. However, in the interference process, a given controlled variable is influenced by the corresponding controlling variable and by other controlling variables. Referring to FIG. 1, a control variable is given by an input signal $u_i(t)$ to the process 10, and a controlled variable is given by an output signal $y_i(t)$ from the process 10. A control system has N loops each corresponding to each input/output pair of the process 10. Each signal having a suffix i (where i=1, 2, ..., N) is given as a vector of N-dimension. A controlled variable $y_i(t)$ output from the process 10, and a set-point value $r_i(t)$ of the controlled variable are supplied to the (−) input terminal and the (+) input terminal of an adder 12, respectively. The adder 12 calculates a control error $e_i(t) = r_i(t) - y_i(t)$ of each loop. The control error $e_i(t)$ is an error of a continuous time and is sampled by a sampler 14 into a sampled-data control error $e_i^*(k)$ of a discrete time. The sampled-data control error $e_i^*(k)$ is supplied to a sampled-data I-PD controller 16. It should be noted that $k = t/\tau_i$, and $\tau_i$ is a sampling period of each loop, which is independent in units of loops. In I-PD control, a local feedback to a control variable is performed by PD action to control the pole location, and a steady state error of the control error is set by I action to be zero. The sampled-data I-PD controller 16 comprises a sampled-data I controller 18, a sampled-data PD controller 20 and an adder 22. The control error $e_i^*(k)$ output from the sampler 14 is supplied to the sampled-data I controller 18. The controlled variable $y_i(t)$ output from the process 10 is converted to a sampled-data controlled variable $y_i^*(k)$ through a sampler 24. The sampler 24 is operated in synchronism with the sampler 14. The sampled-data controlled variable $y_i^*(k)$ is supplied to the sampled-data PD controller 20. The sampled-data I controller 18 and the sampled data PD controller 20 respectively receive the control error $e_i^*(k)$ and the controlled variable $y_i^*(k)$, and respectively perform the sampled-data I calculation and the sampled-data PI calculation. An output signal from the sampled-data I controller 18 and an output signal from the sampled-data PD controller 20 are supplied to the (+) input terminal and the (−) input terminal of the adder 22, respectively. An output signal from the adder 22 is an output signal $u_{Oi}^*(k)$ from the sampled-data I-PD controller 16. In order to satisfy the identifiability condition (e.g., T. Söderström, L. Ljung and I. Gustavsoon: Identifiability Conditions for Linear Multivariable Systems Operating under Feedback, IEEE Trans. act. Control AC-21, 1976) in the closed loop, an identification signal, such as a persistently exciting signal, is supplied to the control system of the present invention and hence to the input terminals of the process 10. The output signal $u_{Oi}^*(k)$ from the sampled-data I-PD controller 16 is supplied to the first (+) input terminal of an adder 26, and a persistently exciting identification signal $v_i^*(k)$ output from an identification signal generator 28 is supplied to the second (+) input terminal of the adder 26. The output signal $(=u_{Oi}^*(k)+v_i^*(k))$ from the adder 26 is given as a control variable $u_i^*(k)$ for the process 10. The control variable $u_i^*(k)$ is converted to the control variable $u_i(t)$ of a continuous time through a 0th holder 30 $[(1-Z^{-\tau_i})/S]$. The control variable $u_i(t)$ is supplied to the process 10.

Control parameters of the sampled-data I-PD controller 16 are automatically tuned in accordance with the dynamic characteristics of the process 10 as follows. The control variable $u_i^*(k)$ of the discrete time output from the adder 26, and the controlled variable $y_i^*(k)$ output from the sampler 24 are supplied to a pulse transfer function identifying circuit 32. The identifying circuit 32 identifies a transfer function in a Z-domain, i.e., a pulse transfer function $G_{ij}(z_i^{-1})$ in accordance with the signals received thereto, where $G_{ij}$ is a pulse transfer function from the jth control variable $u_j(t)$ to the ith controlled variable $y_i(t)$. Note that $z_i^{-1}=e^{-\tau_i s}$. The identified pulse transfer function $G_{ij}(z_i^{-1})$ is supplied to an S-transfer function calculator 34 and is transformed into a transfer function in an S-domain, i.e., an S-transfer function $Gp_{ij}(s)$. The S-transfer function $Gp_{ij}(s)$ is supplied to a control parameter tuning circuit 36. The tuning circuit 36 also receives design parameters $T$, $\tau_2$, $\tau_3$ and $\tau_4$ generated from a design parameter calculator 38 which receives a sampling period $\tau_i$ and a response shape parameter $\alpha_i$ which determines the overshoot characteristic. The sampled-data I-PD controller 16 can be set in the I-PD mode or I-P mode. A mode signal I-PD/I-P is also supplied to the tuning circuit 36. The tuning circuit 36 tunes the sampled-data I-PD control parameters by using inputs in accordance with the process dynamic characteristics.

FIG. 2 is a block diagram showing the relationship between two loops when the process 10 comprises a 2-input/2-output process. The process 10 can be expressed by transfer functions $Gp_{11}(s)$ and $Gp_{22}(s)$ of the respective loops, and transfer functions $Gp_{21}(s)$ and $Gp_{12}(s)$ from the control variable of one loop to the controlled variable of the other loop. Therefore, the I controller is expressed by $g_{11}^*(z_1^{-1})$, $g_{21}^*(z_1^{-1})$, $g_{12}^*(z_2^{-1})$ and $g_{22}^*(z_2^{-1})$, and the PD controller is also expressed by $\lambda_{11}^*(z_1^{-1})$, $\lambda_{21}^*(z_1^{-1})$, $\lambda_{12}^*(z_2^{-1})$ and $\lambda_{22}^*(z_2^{-1})$. The sampling periods of the samplers are independent of each other in units of loops, so that the holder has a sampling period $\tau_1$ or $\tau_2$. Similarly, the identification signals $v_1^*(k)$ and $v_2^*(k)$ are used for the loops, respectively.

The operation of the sampled-data I-PD control apparatus will now be described. In order to identify the dynamic characteristics of the process under the closed loop control, the identification signal $v_i^*(k)$ is superposed on the control variable $u_{Oi}^*(k)$ of each loop. This superposition continues during the identification period of the process dynamic characteristics, and is not generally performed during process control. In this embodiment, a maximum period sequence (M-sequence) signal which is generated by a simple circuit is selected as a persistently exciting signal. The M-sequence signal is expressed as follows when the period is 127 and the amplitude is AM:

$$V^*_i(k) = AM \cdot \{2m(k)-1\} \qquad (1)$$

for $m(k)=MOD[m(k-1)+m(k-7),2]$ where MOD is the modulo operation.

The process dynamic characteristics under the closed loop control can thus be identified. According to equation (1), the M-sequence signal is given as a binary signal. A great change is not given to the process, so that the dynamic characteristics of the process can be stably identified. In addition, the M-sequence signal includes many frequency components, so that an identification can be performed in a short time.

In this embodiment, a Z-domain pulse transfer function $G_{ij}(z_i^{-1})$ is identified in accordance with the control variable $u_i^*(k)$ and the controlled variable $y_i^*(k)$ of the discrete time. A discrete time model of the N-input/N-output process is defined in FIG. 3, so the following equations can be obtained:

$$Y(k) = G(z^{-1})U(k) + W(k) \qquad (2)$$

$$W(k) = G_n(z^{-1})D(k) \qquad (3)$$

where
$Y(k)$: the process output (controlled variable) of the N-dimension vector having $y_i(k)$ as a component
$U(k)$: the process input (control variable) of the N-dimension vector having $u_i(k)$ as a component
$D(k)$: the N-dimension white noise having $d_i(k)$ as a component, in which $$E\{D(k)\} = 0$$

$$E\{D(k)D^T(l)\} = \delta_{kl}\Lambda$$

where
$E\{A\}$ is the expectation of A, and $\Lambda$ is the covariance matrix wherein $\delta_{kl}=1$ for $k=l$, and $\delta_{kl}=0$ for $k \neq l$
$G(z^{-1})$: the $N \times N$ matrix having as a component $$G_{ij}(z_i^{-1}) = B_{ij}(z_i^{-1})/A_{ij}(z_i^{-1})$$

$G_n(z^{-1})$: the $N \times N$ diagonal matrix having as a component $$G_{nii}(z_i^{-1}) = D_i(z_i^{-1})/C_i(z_i^{-1})$$

where
$A_{ij}(z_i^{-1})$, $B_{ij}(z_i^{-1})$, $C_i(z_i^{-1})$ and $D_i(z_i^{-1})$ are polynomials of $z^{-1}$ when equation (3) is substituted into equation (2), and equation (2) is represented by its components, the following is obtained:

$$\begin{bmatrix} y_1(k) \\ \vdots \\ y_N(k) \end{bmatrix} = \qquad (4)$$

$$\begin{bmatrix} B_{11}(z_1^{-1})/A_{11}(z_1^{-1}) & \cdots & B_{1N}(z_1^{-1})/A_{1N}(z_1^{-1}) \\ \vdots & & \vdots \\ B_{N1}(z_N^{-1})/A_{N1}(z_N^{-1}) & \cdots & B_{NN}(z_N^{-1})/A_{NN}(z_N^{-1}) \end{bmatrix} \times$$

$$\begin{bmatrix} u_1(k) \\ \vdots \\ u_N(k) \end{bmatrix} + \begin{bmatrix} D_1(z_1^{-1})/C_1(z_1^{-1}) & & 0 \\ & \ddots & \\ 0 & & D_N(z_N^{-1})/C_N(z_N^{-1}) \end{bmatrix} \times$$

$$\begin{bmatrix} d_1(k) \\ \vdots \\ d_N(k) \end{bmatrix}$$

Equation (4) for the ith process output $y_i(k)$ may be rewritten in the following manner:

$$y_i(k) = \{B_{i1}(z_i^{-1})/A_{i1}(z_i^{-1})\}u_1(k) + \qquad (5)$$

$$\{B_{i2}(z_i^{-1})/A_{i2}(z_i^{-1})\}u_2(k) + \ldots +$$

$$\{B_{iN}(z_i^{-1})/A_{iN}(z_i^{-1})\}u_N(k) + \{D_i(z_i^{-1})/C_i(z_i^{-1})\}d_i(k)$$

Equation (5) indicates a model for the N-input/one-output process. Therefore, the N-input/N-output process can be represented by a combination of the N-input/one-output processes. When equation (5) is solved for $i=1, 2, \ldots N$, an N-input/N-output model is given. When equation (5) is reduced to a common denominator and the denominator is cancelled, the following equation is obtained:

$$A^*(z_i^{-1})y_i(k) = B_1^*(z_i^{-1})u_1(k) + \ldots + \qquad (6)$$

$$B_N^*(z_i^{-1})u_N(k) + C^*(z_i^{-1})d_i(k)$$

for $$A^*(z_i^{-1}) = A_{i1}(z_i^{-1})A_{i2}(z_i^{-1})\ldots A_{iN}(z_i^{-1})C_i(z_i^{-1})$$

$$= 1 + a_1^* z_i^{-1} + \ldots + a_{na}^* A_i^{-na}$$

$$B_1^*(z_i^{-1}) = B_{i1}(z_i^{-1})A_{i2}(z_i^{-1})\ldots A_{iN}(z_i^{-1})C_i(z_i^{-1})$$

$$= b_{11}^*(z_i^{-1})z_i^{-1} + \ldots + b_{1nb1}^* z_i^{-nb1}$$

$$\vdots$$

$$B_N^*(z_i^{-1}) = A_{i1}(z_i^{-1})\ldots A_{iN-1}(z_i^{-1})B_{iN}(z_i^{-1})C_i(z_i^{-1})$$

$$= b_{N1}^*(z_i^{-1})z_i^{-1} + \ldots + b_{NnbN}^* z_i^{-nbN}$$

$$C^*(z_i^{-1}) = A_{N1}(z_i^{-1})\ldots A_{NN}(z_i^{-1})D_i(z_i^{-1})$$

$$= 1 + C_1^* z_i^{-1} + \ldots + C_{nc}^* z_i^{-nc}$$

According to equation (6), a parameter prediction technique used for identifying the one-input/one-output system can also be used for identifying the dynamic characteristics of the multi-input/multi-output system. In the pulse transfer function identifying circuit 32 of this embodiment, the pulse transfer function $G_{ij}(z^{-1})$ of the process is identified by a recursive least square (RLS) algorithm. The pulse transfer function can be identified by the identifying unknown parameters $a_1^*, \ldots, a_{na}^*, b_{11}^*, \ldots, b_{1nb1}^*, \ldots, b_{N1}^*, \ldots, b_{NnbN}^*, C_1^*, \ldots, C_{nc}^*$. The process model can be expressed as follows in accordance with the RLS algorithm.

$$y(k + 1) = \phi^T(k + 1)\hat{\theta}(k) + \epsilon(k + 1) \qquad (7)$$

where T denotes the transpose. A vector $\phi(k)$ and an unknown parameter vector $\theta(k)$ are given as follows:

$$\phi(k) = [-y_i(k - 1), \ldots, -y_i(k - na), u_1(k - 1), \ldots, \qquad (8)$$

$$u_1(k - nb1), \ldots, u_N(k - 1), \ldots, u_N(k - nbN)]^T$$

$$\theta = [a_1, \ldots, a_{na}, b_{11}, \ldots, b_{1nb1}, \ldots, b_{N1}, \ldots, b_{Nnbn}]^T \qquad (9)$$

The RLS algorithm can be given as follows:

$$\theta(k + 1) = \theta(k) + K(k + 1)\epsilon(k + 1) \qquad (10)$$

$$K(k + 1) = \{P(k)\phi(k + 1)\}/\{\lambda(k + 1) + \qquad (11)$$

$$\phi^T(k + 1)P(k)\phi(k + 1)\}$$

$$P(k + 1) = [P(k) - \{P(k)\phi(k + 1)\phi^T(k + 1)P(k)\}/\{\lambda(k + \qquad (12)$$

$$1) + \phi^T(k + 1)P(k)\phi(k + 1)\}]/\lambda(k + 1)$$

$$\lambda(k + 1) = \lambda_0\lambda(k + 1) + (1 - \lambda_0) \qquad (13)$$

where $\lambda(k)$ is the forgetting factor.

The initial values of this algorithm are $\hat{\theta}(0)=0$ and $P(0)=\nu I$ where $\nu$ is a positive large number and I is a unit matrix. The pulse transfer functions $G_{i1}(z_i^{-1}), \ldots, G_{iN}(z_i^{-1})$ with respect to one process output $y_i^*(k)$ are obtained. The identifying circuit 32 repeats the algorithm N times to identify the pulse transfer functions for al process outputs. A recursive extended least square algorithm, a recursive maximum likelihood algorithm or the like may be used as an unknown parameter prediction technique instead of the RLS algorithm. The vectors $\phi(k)$ and $\hat{\theta}$ of the RELS algorithm are given as follows:

$$\phi(k) = [-y_i(k - 1), \ldots, -y_i(k - na), \qquad (14)$$

$$u_1(k - 1), \ldots, u_1(k - nb1), \ldots, u_N(k - 1), \ldots,$$

$$u_N(k - nbN), \epsilon(k - 1), \ldots, \epsilon(k - nc)]^T$$

$$\theta = [a_1, \ldots, a_{na}, b_{11}, \ldots, b_{1nb1}, \ldots, b_{N1}, \ldots, \qquad (15)$$

$$b_{NnbN}, c_1, \ldots, c_{nc}]^T$$

As described above, the process dynamic characteristic can be identified as the pulse transfer function. The sampled data I-PD control parameters are obtained from the S-transfer function in a manner to be described later. The identified pulse transfer function is transformed by the S-transfer function calculator 34 to the S-transfer function. More particularly, the components $G_{ij}(z_i^{-1})$ for $i=1, \ldots, N$ and $j=1, \ldots, N$ of the pulse transfer function in equation (2) are respectively transformed to the S-transfer functions using the following technique. Thereafter, the denominators of the obtained S-transfer functions are reduced to a common denominator to obtain the general transfer function $\tilde{G}p(s)$ for the multi-input/multi-output process. A method for obtaining coefficients $\tilde{G}_0$ and $\tilde{G}_1$ of the following equation is described first.

$$\tilde{G}p(s) = 1/(\tilde{G}_0 + \tilde{G}_1 s + \tilde{G}_2 s^2 + \tilde{G}_3 s^3 + \ldots) \tag{16}$$

A pulse transfer function $G(z^{-1})$ of the subprocess is defined as follows:

$$G(z^{-1}) = \sum_{i=1}^{nb} b_i z^{-i} / \left(1 + \sum_{i=1}^{na} a_i z^{-i}\right) \tag{17}$$

$$= \sum_{i=0}^{\infty} g_i \cdot z^{-i}$$

The step response in equation (17) is given as $x_n$ defined as follows:

$$x_n = \sum_{i=0}^{n} g_i \quad (n = 0, 1, 2 \ldots) \tag{18}$$

The step response $x_n$ is approximated by an $(m+1)$th polynomial as a function of t, so that $$\tilde{x}_n(t) = \sum_{i=0}^{m} f_{i,n} \cdot (t - n\tau)^i \tag{19}$$
$$\text{for } n\tau \leq t \leq (n+1)\tau$$

The coefficients $f_{i,n}$ ($i=0, 1, \ldots m$) are obtained on the basis of $$\tilde{x}_n(j\tau) = x_j \tag{20}$$
$$(j = n+1, n, n-1, \ldots, n-m+1)$$

by solving the following simultaneous equations:

$$\begin{pmatrix} x_{n+1} \\ x_n \\ x_{n-1} \\ \cdot \\ \cdot \\ \cdot \\ x_{n-m+1} \end{pmatrix} = \tag{21}$$

$$\begin{pmatrix} 1 & \tau & \tau^2 & \ldots & \tau^m \\ 1 & 0 & 0 & \ldots & 0 \\ 1 & -\tau & (-\tau)^2 & \ldots & (-\tau)^m \\ \cdot & \cdot & \cdot & & \cdot \\ \cdot & \cdot & \cdot & & \cdot \\ \cdot & \cdot & \cdot & & \cdot \\ 1 & -(m-1)\tau & (-(m-1)\tau)^2 & \ldots & (-(m-1)\tau)^m \end{pmatrix} \begin{pmatrix} f_0 \\ f_{1,n} \\ f_{2,n} \\ \cdot \\ \cdot \\ \cdot \\ f_{m,n} \end{pmatrix}$$

When the following equations are given:

$$\tilde{X}_n(s) = \int_{n\tau}^{(n+1)\tau} \tilde{x}_n(t) e^{-st} dt \tag{22}$$

$$\tilde{X}(s) = \sum_{n=0}^{\infty} \tilde{X}_n(s) \tag{23}$$

$\tilde{X}(s)$ is regarded as an approximation of a Laplace transform $X(s)$ of the step response $x(t)$ of the controlled process. Therefore, an S-transfer function $\tilde{G}p(s)$ can be calculated as follows:

$$\tilde{G}p(s) = s \cdot \tilde{X}(s) \tag{24}$$

The solution to equation (21) is substituted in equations (22) to (24) to give:

$$\tilde{G}p(s) = Gp(e^{-\tau s}) \cdot \Delta^{(m)}(s) \tag{25}$$

The first term of the right-hand side of equation (25) is obtained by substituting $z = e^{\tau s}$ in the pulse transfer function $G(z^{-1})$ of equation (17), and the second term thereof is a correction term. When equation (26) is given as follows:

$$G(e^{\tau s}) = 1/(C_0 + C_1 s + C_2 s^2 + C_3 s^3 + \ldots) \tag{26}$$

the coefficients $C_i$ ($i=0, 1, 2, \ldots$) are obtained.

$$C_0 = A_0/B_0 \tag{27}$$

$$C_n = \left(A_n - \sum_{i=0}^{n-1} C_i B_{n-i}\right) / B_0 \tag{28}$$

for $n = 1, 2, \ldots$ $$A_0 = 1 + \sum_{i=1}^{na} a_i \tag{29}$$

$$A_n = \{(-\tau)^n/n!\} \sum_{i=1}^{na} i^n \cdot a_i \tag{30}$$

for $n = 1, 2, \ldots$ $$B_0 = \sum_{i=1}^{nb} b_i \tag{31}$$

$$B_n = \{(-\tau)^n/n!\} \sum_{i=1}^{nb} i^n \cdot b_i \tag{32}$$

for $n = 1, 2, \ldots$

The correction term $\Delta^{(m)}(s)$ is expressed as follows:

$$\Delta^{(m)}(s) = d_0 + d_1(\tau s) + d_2(\tau s)^2 + \ldots \tag{33}$$

The denominator coefficient of the S-transfer function $\tilde{G}p(s)$ can be obtained as follows:

$$\tilde{G}_0 = C_0 \tag{34}$$

$$\tilde{G}_n = C_n - \sum_{i=1}^{n} d_i \tilde{G}_{n-i} \tau^i \tag{35}$$

for $n = 1, 2, \ldots$

The coefficients $d_i$ ($i=0, 1, 2, \ldots$) in equation (35) are shown in Table 1 below:

TABLE

| m | $\Delta^{(m)}(s)$ | $(\Delta^{(m)}(s)$ and $d_j$ parameters) | | | | | | | |
|---|---|---|---|---|---|---|---|---|---|
| | | $d_0$ | $d_1$ | $d_2$ | $d_3$ | $d_4$ | $d_5$ | $d_6$ | $d_7$ |
| 0 | $\Delta^{(0)}(s) = 1$ | 1 | 0 | 0 | 0 | 0 | 0 | 0 | 0 |
| 1 | $\Delta^{(1)}(s) = (e^{\tau s} - 1)/\tau_s$ | 1 | ½ | 1/6 | 1/24 | 1/120 | 1/720 | 1/5,040 | 1/40,320 |
| 2 | $\Delta^{(2)}(s) = (1 + \tau_s/2)$ $\cdot (e^{\tau s} + e^{-\tau s} - 2)/(\tau_s)^2$ | 1 | ½ | 1/12 | 1/24 | 1/360 | 1/720 | 1/20,160 | 1/40,320 |
| 3 | $\Delta^{(3)}(s) = (1 + \tau_s + (\tau_s)^2/3)$ $\cdot (3e^{-\tau s} - 3 + e^{\tau s} - e^{-2\tau s})/(\tau_s)^3$ | 1 | ½ | 1/12 | 0 | 1/40 | -13/1,440 | 422/120,960 | -348/362,880 |
| 4 | $\Delta^{(4)}(s) = (1 + 3\tau_s/2$ $+ 11\tau_s^2/12 + \tau_s^3/4)$ $\cdot (e^{\tau s} - 4 + 6e^{-\tau s} - 4e^{-2\tau s}$ $+ e^{-3\tau s})/(\tau_s)^4$ | 1 | ½ | 1/12 | 0 | -1/720 | 3/160 | -14,689/907,200 | 271,928/3,791,928 |

The S-transfer function calculator 34 transforms each pulse transfer function $G_{ij}(z^{-1})$ to the S-transfer function $Gp_{ij}(s)$ by the above means. In general, denominator polynomials of the transfer functions $Gp_{ij}(s)$ differ from each other. The denominator polynomials are then reduced to a common denominator to obtain the general transfer function for the multi-input/multi-output process. In particular, the S-transfer function Gp(s) for the N-input/N-output process 10 is expressed as follows:

$$Gp(s) = B(s)/a(s) \quad (36)$$
$$= (B_0 + B_1 s + B_2 s^2 + B_3 s^3 \ldots )/(a_0 + a_1 s + a_2 s^2 + a_3 s^3 + \ldots )$$

for $a_i \in R^1$, $a_0 \neq 0$, $B_i \in R^{N \times N}$, and $B_0 \neq 0$.

The auto-tuning operation of the control parameter will be described wherein the sampled-data I-PD control system is defined as shown in FIG. 4.

The sampled data I controller 18 is approximated as follows:

$$K^*(\Delta) = K^* \Delta^{-1} \quad (37)$$

The sampled-data PD controller 20 is approximated as follows:

$$F^*(\Delta) = F_0^* + F_1^* \Delta F_2^* \Delta^2 + F_3^* \Delta^3 + \ldots \quad (38)$$

where $$\Delta = \begin{pmatrix} \delta_1 & & & \\ & \delta_2 & & 0 \\ & & \ddots & \\ & 0 & & \\ & & & \delta_N \end{pmatrix} \quad (39)$$

for $\delta_i = (1 - z_i^{-1})/\tau_i \quad (40)$
$z_i = e^{\tau_i s} \quad (41)$ The difference operator $\delta_i$ corresponds to a differential operator s of a continuous time. As the sampling period $\tau_i$ is increased to zero, the difference operator $\delta_i$ becomes s of a continuous time; $k/\delta_i$ becomes $k/s$; and $k\delta_i$ becomes $ks$. The approximation of the sampled-data I controller 18 and the sampled-data PD controller 20 with respect to a continuous time base is expressed as follows:

$$K/s = [K^*(\Delta)T^{-1}(I - z^{-1})]/s \quad (42)$$

$$F = [F^*(\Delta)T^{-1}(I - z^{-1})]/s \quad (43)$$

A means A is a polynomial of s.

$$T = \begin{pmatrix} \tau_1 & & & \\ & \tau_2 & & 0 \\ & & \ddots & \\ & 0 & & \\ & & & \tau_N \end{pmatrix}, \quad (44)$$

$$Z = \begin{pmatrix} z_1 & & & \\ & z_2 & & 0 \\ & & \ddots & \\ & 0 & & \\ & & & z_N \end{pmatrix}$$

When equation (37) is substituted in equation (42):

$$K/s = K^*/s \quad (45)$$

Equation (38) is then substituted into equation (43) to provide:

$$\begin{aligned} F &= [F_0^* \Delta + F_1^* \Delta^2 + F_2^* \Delta^3 + F_3^* \Delta^4]/s \quad (46) \\ &= [F_0^*(sI - Ts^2/2 + T^2s^3/6 - T^3s^4/24 + \ldots) \\ &\quad + F_1^*(s^2 I - Ts^3 + 7T^2 s^4/12 + \ldots) \\ &\quad + F_2^*(s^3 I - 3Ts^4/2 + \ldots) \\ &\quad + F_3^*(s^4 I - 2Ts^5 + \ldots)]/s \\ &= F_0^* + s(F_1^* - F_0^* T/2) \\ &\quad + s^2(F_2^* - F_1^* T + F_0^* T^2/6) \\ &\quad + s^3(F_3^* - 3F_2^* T/2 + 7F_1^* T^2/12 - F_0^* T^3/24) \\ &\quad + \ldots \end{aligned}$$

The parameter tuning circuit 36 calculates the control parameter matrix $K^*$ of equation (37) and the control parameter matrices $F_0^*$, $F_1^*$, $F_2^*$ and $F_3^*$ of equation (38) in the following manner. The coefficients of s of equation (46) are expressed as follows:

$$F_0 = F_0^* \quad (47)$$

$$F_1 = F_1^* - F_0^* T/2 \quad (48)$$

$$F_2 = F_2^* - F_1^* T + F_0^* T^2/6 \quad (49)$$

$$F_3 = F_3^* - 3F_2^* T/2 + 7F_1^* T^2/12 - F_0^* T^3/24 \quad (50)$$

Equations (47) to (50) are solved for the control parameters $F_0^*$, $F_1^*$, $F_2^*$ and $F_3^*$:

$$F_0^* = F_0 \quad (51)$$

$$F_1^* = F_1 + F_0 T/2 \quad (52)$$

$$F_2^* = F_2 + F_1 T + F_0 T^2/3 \quad (53)$$

$$F_3^* = F_3 + 3F_2 T/2 + 11F_1 T^2/12 + F_0 T^3/4 \quad (54)$$

The parameter tuning circuit 36 produces the control parameters $K^*$, $F_0^*$, $F_2^*$ and $F_3^*$ such that the dynamic characteristic of the process, i.e., the S-transfer function $(Gp(s)=B(s)/a(s))$ from the set-point value $R(s)$ to the process output $Y(s)$ of the controlled loop (FIG. 4), is matched with the reference model $M_\Sigma$. This model matching can be performed in accordance with the following equation:

$$I + sK^{-1}(H+F) = M_\Sigma \tag{55}$$

According to equation (45), $K = K^*$ is obtained. In addition, $$H = Gp^{-1}(s) = B^{-1}(s)a(s) \tag{56}$$

According to equation (36), $$Gp(s) = H^{-1}(s) \tag{57}$$
$$= (H_0 + H_1 s + H_2 s^2 + H_3 s^3 + \ldots)^{-1}$$

where $$H_0 = a_0 B_0^{-1} \tag{58}$$

$$H_1 = (a_1 I - H_0 B_1) B_0^{-1} \tag{59}$$

$$H_2 = (a_2 I - H_0 B_2 - H_1 B_1) B_0^{-1} \tag{60}$$

$$H_3 = (a_3 I - H_0 B_3 - H_1 B_2 - H_2 B_2) B_0^{-1} \tag{61}$$

The following model which has no interference and in which overshoot can be easily changed according to the response shape parameter $a_1$ is selected as the reference model:

$$M(s)_\Sigma = I + \Sigma s + \Gamma_2 \Sigma^2 s^2 + \Gamma_3 \Sigma^3 s^3 + \Gamma_4 \Sigma^4 s^4 + \ldots \tag{62}$$

$$\Sigma = \begin{pmatrix} \sigma_1 & & & \\ & \sigma_2 & & 0 \\ & 0 & \ddots & \\ & & & \sigma_N \end{pmatrix} \tag{63}$$

$$\Gamma_2 = \begin{pmatrix} \gamma_{21} & & & \\ & \gamma_{22} & & 0 \\ & 0 & \ddots & \\ & & & \gamma_{2N} \end{pmatrix} \tag{64}$$

for

I-P mode: $\gamma_{2i} = a_i/2 + (1 - a_i)/3$ \quad (65)

I-PD mode: $\gamma_{2i} = a_i/2 + 3(1 - a_i)/8$ \quad (66)

$$\Gamma_3 = \begin{pmatrix} \gamma_{31} & & & \\ & \gamma_{32} & & 0 \\ & 0 & \ddots & \\ & & & \gamma_{3N} \end{pmatrix} \tag{67}$$

for

I-P mode: $\gamma_{3i} = 3a_i/20 + (1 - a_i)27$ \quad (68)

I-PD mode: $\gamma_{3i} = 3a_i/20 + (1 - a_i)16$ \quad (69)

$$\Gamma_4 = \begin{pmatrix} \gamma_{41} & & & \\ & \gamma_{42} & & 0 \\ & 0 & \ddots & \\ & & & \gamma_{4N} \end{pmatrix} \tag{70}$$

for

I-PD mode: $\gamma_{4i} = 3a_i/100 + (1 - a_i)/256$ \quad (71)

Figure 5:
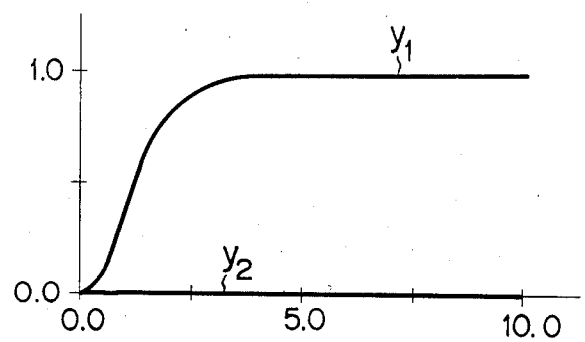
FIGS. 5 and 6 are respectively graphs of the relationship between the response shape parameter and the step response.
Figure 6:
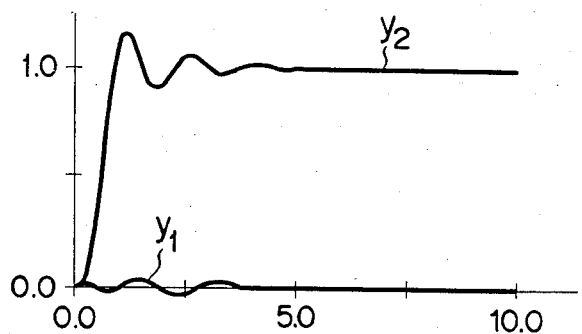

The response shape parameter $a_i$ is set to be a proper value in the range between 0 and 1.0. This parameter $a_1$ can be independently set for each loop, so that the response shape of the reference model can be easily set for each loop. For example, FIGS. 5 and 6 show step responses of the reference model when the response shape parameters $a_i$ are given as $a_1 = 0$ and $a_2 = 1.0$ for $N = 2$. FIG. 5 shows process outputs $y_1$ and $y_2$ when the set-point value $r_1$ changes in a stepwise manner. These outputs have substantially no overshoot. FIG. 6 shows process outputs $y_1$ and $y_2$ when the set-point value $r_2$ changes in a stepwise manner. Each of these process outputs $y_1$ and $y_2$ has about a 10% overshoot.

The following equations are obtained as a result of model matching using equation (62):

$$K^{-1}(H_0 + F_0) = \Sigma \text{ (for s)} \tag{72}$$

$$K^{-1}(H_1 + F_1) = \Gamma_2 \Sigma^2 \text{ (for } s^2\text{)} \tag{73}$$

$$K^{31\ 1}(H_2 + F_2) = \Gamma_3 \Sigma^3 \text{ (for } s^3\text{)} \tag{74}$$

$$K^{-1}(H_3 + F_3)L = \Gamma_4 \Sigma^4 \text{ (for } s^4\text{)} \tag{75}$$

When equations (72) to (75) are solved for the $F_0$, $F_1$, $F_2$ and $F_3$, the following equations are given:

$$F_0 = K\Sigma - H_0 \tag{76}$$

$$F_1 = K\Gamma_2 \Sigma^2 - H_1 \tag{77}$$

$$F_2 = K\Gamma_3 = H_2 \tag{78}$$

$$F_3 = K\Gamma_4 - H_3 \tag{79}$$

Substitution of equations (76) to (79) into equations (51) to (54), respectively, yield:

$$F_0^* = K^*\Sigma - H_0 \tag{80}$$

$$F_1^* = (K^*\Gamma_2\Sigma^2 - H_1) + (K^*\Sigma - H_0)T/2 \tag{81}$$
$$= K^*\Gamma_2\Sigma^2 + K^*T\Sigma/2 - (H_1 + H_0 T/2)$$

$$F_2^* = (K^*\Gamma_3\Sigma^3 - H_2) + (K^*\Gamma_2\Sigma^2 - H_1)T + (k^*\Sigma - H_0)T^2/3 \tag{82}$$
$$= K^*\Gamma_3\Sigma^3 + K^*\Gamma_2 T\Sigma^2 + K^*T^2\Sigma/3 - (H_2 + H_1 T + H_0 T^2/3)$$

$$F_3^* = (K^*\Gamma_4\Sigma^4 - H_3) + 3(K^*\Gamma_3\Sigma^3 - H_2)T/2 + \tag{83}$$
$$11(K^*\Gamma_2\Sigma^2 - H_1)T^2/12 + (K^*\Sigma - H_0)T^3/4$$
$$= K^*\Gamma_4\Sigma^4 + 3K^*\Gamma_3 T\Sigma^3/2 + 11K^*\Gamma_2 T^2\Sigma^2/12 +$$

$$K^*T^3\Sigma/4 - (H_3 + 3H_2 T/2 + 11H_1 T^2/12 + H_0 T^3/4)$$

Equations (80) to (83) still include an unknown matrix $\Sigma$ and the parameter $K^*$, so that $\Sigma$ and $K^*$ are obtained using equations (80) to (83).

Since $\Sigma$ and $K^*$ vary in accordance with different operation modes, they must be obtained for each operation mode.

In the I-P mode, since $F_1^* = F_2^* = 0$ is established, the following simultaneous equations are given:

$$\begin{cases} K^*(\Gamma_2\Sigma^2 + T\Sigma/2) = (H_1 + H_0T/2) & (84) \\ K^*(\Gamma_3\Sigma^3 + \Gamma_2T\Sigma^2 + T^2\Sigma/3) = (H_2 + H_1T + H_0T^2/3) & (85) \end{cases}$$

When $K^*$ is eliminated from equations (84) and (85), the equation about $\Sigma$ is obtained as follows:

$$(H_1 + H_0T/2)\Gamma_3\Sigma^2 - (H_2 - H_0T^2/6)\Gamma_2\Sigma - (H_2/2 + H_1T/6)T = 0 \quad (86)$$

Equation (86) is rewritten as follows:

$$\Gamma_3\Sigma^2 - (\tilde{H}_1 - T/3)\Gamma_2\Sigma - \tilde{H}_1T/2 = 0 \quad (87)$$

where $$\tilde{H}_1 = [(H_1 + H_0T/2)^{-1}(H_2 + H_1T/3)]\text{diag} \quad (88)$$

The unknown matrix $\Sigma$ is given by a smallest positive root of equation (87).

The control parameter matrices $K^*$ and $F_0^*$ in the I-P mode can be obtained as follows:

$$K^* = (H_1 + H_0T/2)(\Gamma_2\Sigma^2 + T\Sigma/2)^{-1} \quad (89)$$

$$F_0^* = K^*\Sigma - H_0 \quad (90)$$

In the I-PD mode, $F_2^* = F_3^* = 0$ is given, so that the following simultaneous equations are obtained:

$$\begin{cases} K^*(\Gamma_3\Sigma^3 + \Gamma_2T\Sigma^2 + T^2\Sigma/3) = \\ \qquad (H_2 + H_1T + H_0T^2/3) & (91) \\ K^*(\Gamma_4\Sigma^4 + 3\Gamma_3T\Sigma^3/2 + 11\Gamma_2T^2\Sigma^2/12 + T^3\Sigma/4) = \\ \qquad (H_3 + 3H_2T/2 + 11H_1T^2/12 + H_0T^3/4) & (92) \end{cases}$$

When the parameter $K^*$ is eliminated from equations (91) and (92), the following equation about $\Sigma$ is obtained:

$$(H_2 + H_1T + H_0T^2/3)\Gamma_4\Sigma^3 + (-H_3 + 7H_1T^2/12 + H_0T^3/4)\Gamma_3\Sigma^2 + (-H_3 - 7H_2T/12 + H_0T^3/18)\Gamma_2T\Sigma + (-H_3/3 - H_2T/4 - H_1T^2/18)T^2 = 0 \quad (93)$$

Equation (93) is written in the following manner:

$$\Gamma_4\Sigma^3 - (\tilde{H}_2 - 3T/4)\Gamma_3\Sigma^2 - (\tilde{H}_2 - T/6)T\Gamma_2\Sigma - \tilde{H}_2T^2/3 = 0 \quad (94)$$

for $$\tilde{H}_2 = [(H_2 + H_1T + H_0T^2/3)^{-1} \times (H_3 + 3H_2T/4 + H_1T^2/6)]\text{diag} \quad (95)$$

The unknown matrix $\Sigma$ is the smallest positive root of equation (94). In the I-PD mode, the control parameter matrices $K^*$, $F_0^*$ and $F_1^*$ are obtained as follows:

$$K^* = (H_2 + H_1T + H_0T^2/3) \times (\Gamma_3\Sigma^3 + T\Gamma_2\Sigma^2 + T^2\Sigma/3)^{-1} \quad (96)$$

$$F_0^* = K^*\Sigma - H_0 \quad (97)$$

$$F_1^* = K^*\Gamma_2\Sigma^2 + K^*T\Sigma/2 - H_1 - H_0T/2 \quad (98)$$

The parameter tuning circuit 36 produces optimal values of the control parameters $K^*$, $F_0^*$ and $F_1^*$ for the sampled-data I-PD controller 16 in accordance with the identified process dynamic characteristic. In other words, the parameter tuning circuit 36 tunes the parameters.

The data $g_{ij}(z_i^{-1})$ and $\lambda_{ij}(z_i^{-1})$ of the controllers in FIG. 2 satisfies the following relations when the ij components of the $K^*$, $F_0^*$ and $F_1^*$ are given as $k_{ij}^*$, $f_{0ij}^*$ and $f_{1ij}^*$:

$$g_{ij}(z_j^{-1}) = g_{0ij}(1 - z_j^{-1})^{-1} \quad (99)$$

for $$g_{0ij} = k_{ij}^* \cdot \tau_j \quad (100)$$

$$\lambda_{ij}(z_j^{-1}) = (\lambda_{0ij} - \|\lambda_{1ij}z_j^{-1} + \lambda_{2ij}z_j^{-2}) \times (1 - z_j^{-1})^{-1} \quad (101)$$

for $$\lambda_{0ij} = f_{0ij}^* + f_{1ij}^* \cdot \tau_j^{-1} \quad (102)$$

$$\lambda_{1ij} = f_{0ij}^* + 2f_{1ij}^* \cdot \tau_j^{-1} \quad (103)$$

$$\lambda_{2ij} = f_{1ij} \quad (104)$$

The control variable $u^*$ can be calculated by $e^*$ and $y^*$ in accordance with the velocity type control algorithm given by the following equations:

$$u_{ij}^*(k\tau_j) = u_{ij}^*(\overline{k-1}\tau_j) + \delta u_{ij}^*(k\tau_j) \quad (105)$$

for $$\delta u_{ij}^*(k\tau_j) = g_{0ij}e_j^*(k\tau_j) - \lambda_{0ij}y_j^*(k\tau_j) + \lambda_{1ij}y_j^*(\overline{k-1}\tau_j) - \lambda_{2ij}y_j^*(\overline{k-2}\tau_j) \quad (106)$$

The sampled-data I-PD control can be performed for the multi-input/multi-output process 10 in accordance with its dynamic characteristic.

According to the present invention as described above, in order to satisfy the identifiability condition, the identification signal of several percentages of the control variable are applied to the output terminal of the controller (i.e., input terminal of the process), so that the process dynamic characteristic (pulse transfer function) can be identified. The S-transfer function is obtained from the identified pulse transfer function and is matched with the noninterference multi-input/multi-output reference model whose overshoot can be arbitrarily determined for every loop, thereby obtaining the sampled-data I-PD control parameters. Therefore, these control parameters can be auto-tuned in accordance with the process dynamic characteristic. For this reason, even if the process to be controlled tends to be interfered with, or has different set-point values of the respective loops, each loop can be optimally controlled. In addition, since I-PD control instead of PID control is performed, the cancellation of pole-zero does not occur. Therefore, according to the invention the controlled variable can be always optimally controlled to be equal to the set-point value and will not be influenced by disturbance. Furthermore, since a small amplitude identification signal is used, the process will not be subject to great variations, unlike the limit sensitivity method and the limit cycle method. In addition, identification and closed loop control are simultaneously performed, so that the tuning period of the controller can be shortened.

In the above description, the interference multi-input/multi-output process is an object to be controlled. However, the present invention can also be applied to a noninterference multi-input/multi-output process and a one-input/one-output process. When the proportional gain of the I-PD controller is set to be zero, the controller is set in the open loop control mode. The identification signal is applied to the output terminal of the controller so that the process dynamic characteristic can be identified in the open loop control mode in the same manner as in the closed loop mode. Any signal, belonging to the steady state irregular process, such as a pseudo random signal, a normal random signal or the like can be used as the persistently exciting identification signal. The M-sequence signal need not be directly applied but can be processed through a digital filter; a filtered M-sequence signal can be used. In addition to this modification, the response shape parameter can change during tuning. In the above embodiment, the response shape parameter continuously changes. However, this parameter can be selected from the preselected values.

What is claimed is:

1. A sampled-data I-PD control apparatus for an interference N-(positive integer not less than 2), input/N-output process comprising:
   control error calculating means for calculating respective differences between N outputs of the process and corresponding N set-point values to generate N control errors;
   sampled-data I-PD controller means for calculating the N outputs of the process and the N control errors in accordance with sampled-data I-PD control parameters to obtain N control variables, and for supplying the N control variables to N inputs of the process;
   identification signal generating means for respectively supplying N persistently exciting identification signals to the N inputs of the process;
   identifying means for identifying a pulse transfer function of the process in accordance with the N inputs and the N outputs of the process while the N persistently exciting identification signals are supplied to the N inputs;
   S-transfer function calculating means for transforming an identified transfer function to an S-transfer function; and
   tuning means for calculating an S-transfer function from the set-point values to the process outputs in accordance with a transformed S-transfer function, matching the calculated S-transfer function with an S-transfer function from the set-point values to the process outputs of a noninterference N-input/N-output process model, and tuning the sampled-data I-PD control parameters in accordance with a matching result.

2. An apparatus according to claim 1, in which said control error calculating means comprises a first adder a (+) input terminal of which receives the N set-point values and a (−) input terminal of which receives the N outputs from the process, and a first sampler for sampling outputs from said first adder.

3. An apparatus according to claim 2, in which said sampled-data I-PD controller means comprises a sampled-data I controller for receiving an output from said first sampler, a sampled-data PD controller for receiving the N outputs of the process through a second sampler for sampling the N outputs from the process in synchronism with said first sampler, and a second adder a (+) input terminal of which receives an output from said sampled-data I controller and a (−) input terminal of which receives an output from said sampled-data PD controller, an output from said second adder being supplied to the process through a holder.

4. An apparatus according to claim 3, in which a third adder is connected between said second adder and said holder to add the output from said second adder and an output from said identification signal generating means and to supply an addition result to said holder.

5. An apparatus according to claim 4, in which the N outputs from the process are supplied to said identifying means through said second sampler, and an output from said third adder is directly supplied to said identifying means.

6. An apparatus according to claim 1, in which said identification signal generating means generates a maximum period sequence signal.

7. An apparatus according to claim 1, in which said sampled-data I-PD controller means calculates the control variables in accordance with a velocity type control algorithm.

8. An apparatus according to claim 1, in which said identifying means identifies the pulse transfer function in accordance with a recursive least square algorithm.

9. An apparatus according to claim 1, in which said S-transfer function calculating means calculates the S-transfer function by Laplace-transforming a response obtained by linearly approximating a step response of the pulse transfer function.

10. An apparatus according to claim 1, in which said tuning means selects a model as a control model wherein an overshoot between input/output pairs is independently variable in accordance with a response shape parameter.

* * * * *